Sept. 2, 1969          K. R. LAMB ETAL          3,464,435

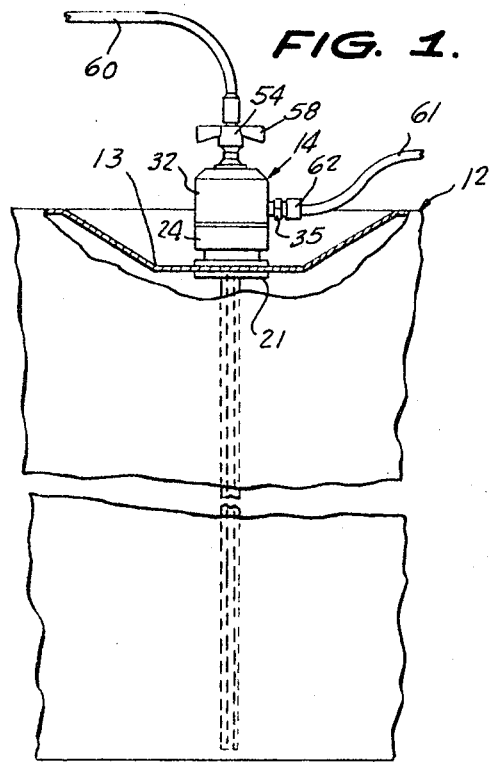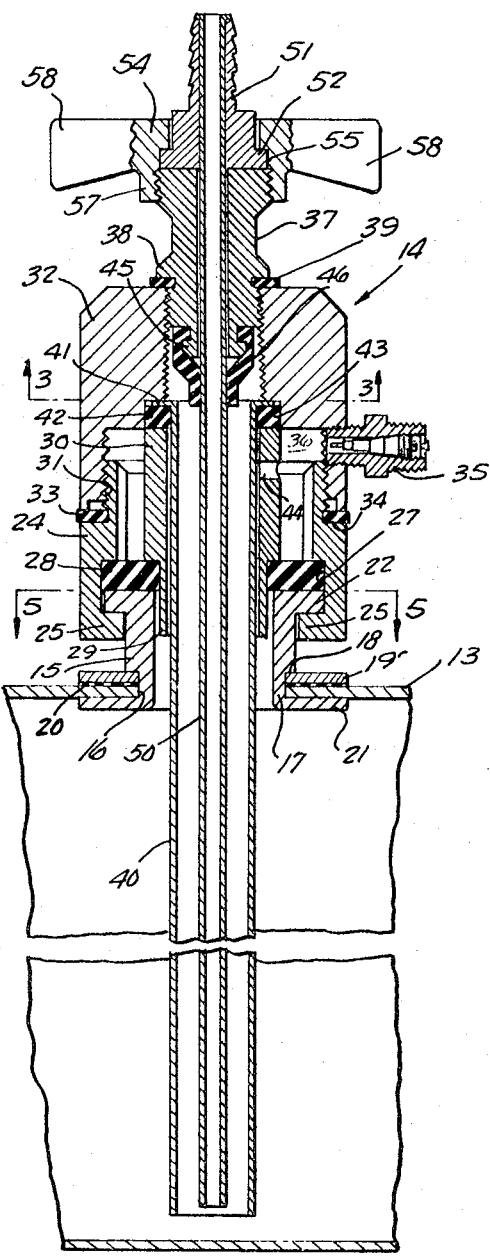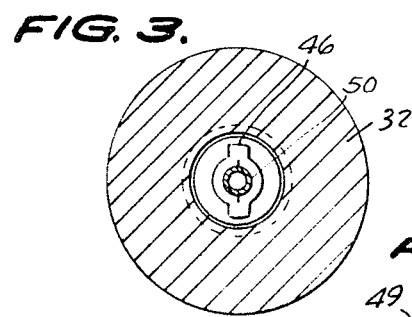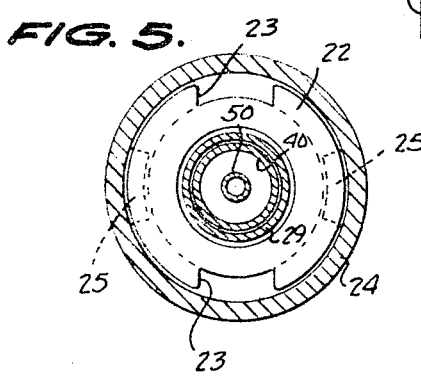

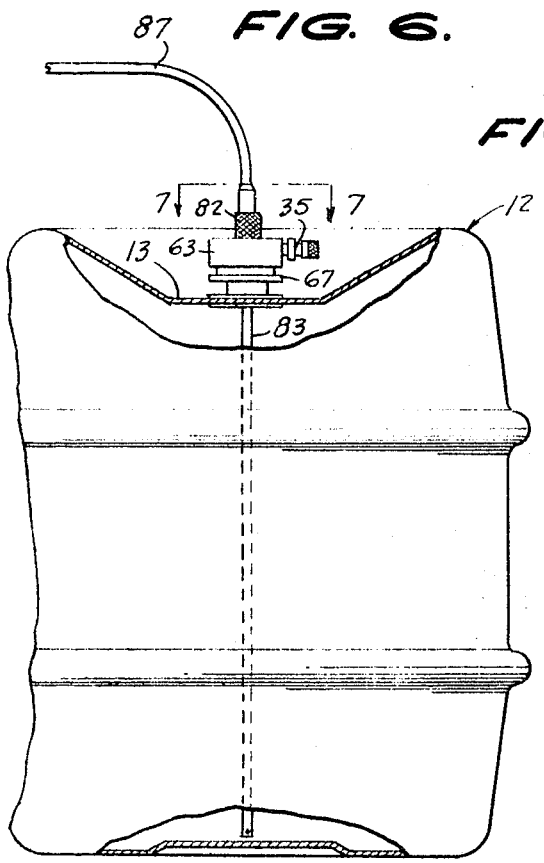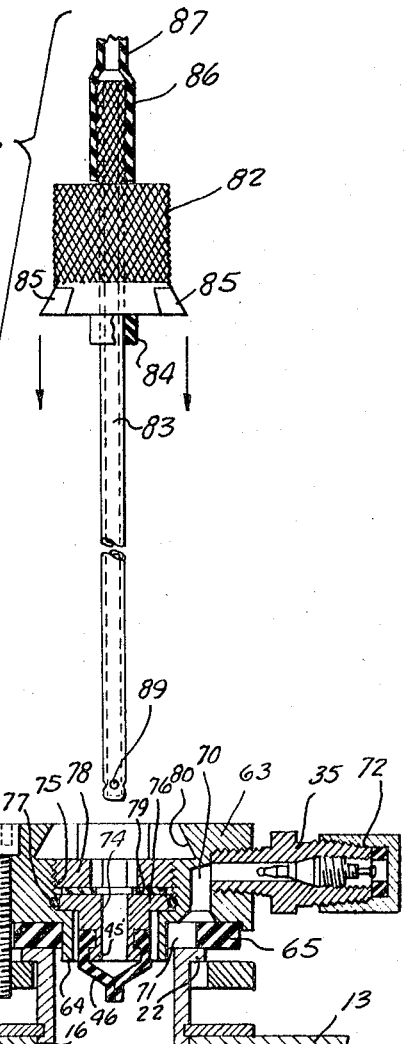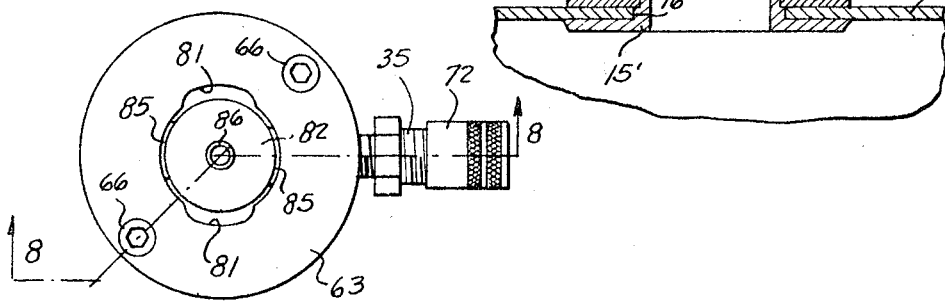

QUICK KEG TAP WITH SELF-SEALING CONNECTION

Filed May 19, 1967          3 Sheets-Sheet 3

INVENTORS
KAY R. LAMB,
CHARLES R. MANDEVILLE,
BY
Berman, Davidson & Berman
ATTORNEYS.

United States Patent Office 3,464,435
Patented Sept. 2, 1969

3,464,435
QUICK KEG TAP WITH SELF-SEALING
CONNECTION
Kay R. Lamb, 1105 Ridge Ave., and Charles R. Mandeville, 1823 Latham St., both of Rockford, Ill. 61103
Filed May 19, 1967, Ser. No. 639,707
Int. Cl. F04f 1/00; B67d 5/54; B65d 83/14
U.S. Cl. 137—212
10 Claims

ABSTRACT OF THE DISCLOSURE

A keg-tapping assembly consisting of a collar installed in an opening of a keg. A bushing assembly carrying a sleeve is fastened on the collar with the sleeve extending through the collar with clearance for gas to pass into the keg. A normally closed pressure-responsive gas-admission valve of the type used in pneumatic tires is provided on the bushing assembly. The bushing assembly also includes a normally collapsed live rubber axial conduit. A removable draft tube assembly can be mounted on the bushing assembly, the draft tube assembly including a rigid draft tube which is forced through the live rubber conduit and is contained coaxially in the sleeve, the draft tube extending into the keg to a considerable depth so that beverage can be forced out through the draft tube responsive to the admission of gas under pressure through the gas-admission valve. When the draft tube assembly is withdrawn, the live rubber conduit collapses, sealing off the assembly so that foreign material cannot enter the keg.

---

This invention relates to keg-tapping assemblies, and more particularly to a tap assembly for extracting the contents of a keg or barrel, the assembly being of the type having a self-sealing action which seals the keg or barrel to prevent entry of foreign material when the liquid-extracting conduit of the assembly is removed.

A main object of the invention is to provide a novel and improved keg-tapping assembly of the self-sealing type, said assembly being relatively simple in construction, being easy to install, and providing a reliable self-sealing action to adequately seal the assembly responsive to the withdrawal of its draft tube, thereby preventing the entry of undesirable foreign material or objects.

A further object of the invention is to provied an improved self-sealing keg-tapping assembly which involves relatively inexpensive components, which is durable in construction, which is easy to keep clean, and wherein the removable draft tube thereof can be easily inserted or removed without requiring the use of tools.

A still further object of the invention is to provide an improved self-sealing keg-tapping assembly of the type including a collapsible conduit element which automatically closes responsive to the removal of the draft tube member of the assembly therefrom, whereby the associated keg is completely sealed against the entry of undesirable foreign objects or materials, the assembly involving a relatively small number of parts, being easy to maintain in operating condition, and providing improved assurance against contamination of kegs or barrels by vermin or other undesirable foreign materials or objects.

Further objects and advantages of the invention will become apparent from the following description and claims, and from the accompanying drawings, wherein:

FIGURE 1 is an elevational view of a portion of the wall of a keg provided with an improved keg-tapping assembly constructed in accordance with the present invention.

FIGURE 2 is an enlarged vertical cross-sectional view taken axially through the keg-tapping assembly of FIGURE 1.

FIGURE 3 is a horizontal cross-sectional view taken substantially on the line 3—3 of FIGURE 2.

FIGURE 4 is a perspective view of the collapsible sealing member employed in the assembly of FIGURES 1, 2 and 3.

FIGURE 5 is a horizontal cross-sectional view taken substantially on the line 5—5 of FIGURE 2.

FIGURE 6 is a fragmentary elevational view of a keg, with the top and bottom portions thereof shown in vertical cross-section, and with the top wall of the keg provided with a modified form of keg-tapping assembly constructed in accordance with the present invention.

FIGURE 7 is an enlarged horizontal cross-sectional view taken substantially on the line 7—7 of FIGURE 6.

FIGURE 8 is a vertical cross-sectional view, to a somewhat larger scale, taken on the line 8—8 of FIGURE 7, and showing parts of the assembly in separated positions.

Figure 9:
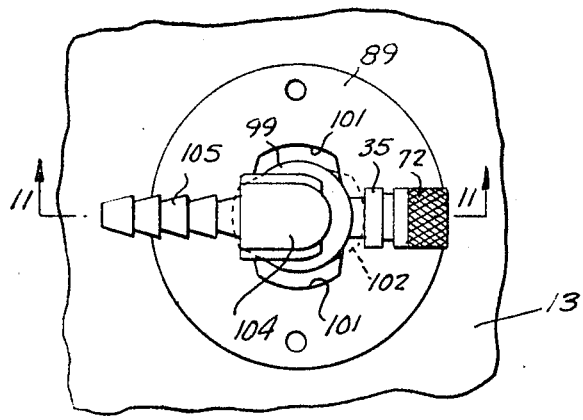
FIGURE 9 is a top plan view of a further modified form of keg-tapping assembly constructed in accordance with the present invention.

Referring to the drawings, and more particularly to FIGURES 1 to 5, 12 designates a conventional beverage keg having a recessed top wall portion 13 in which is mounted an improved keg-tapping assembly constructed in accordance with the present invention, designated generally at 14.

The assembly 14 comprises a stationary collar element 15 which is permanently installed in an aperture 16 in the horizontal center portion of the top wall recess 13. Thus, as shown in FIGURE 2, the collar member 15 has the reduced lower portion 17 which fits through the aperture 16, said reduced lower portion defining an annular shoulder 18. The annular shoulder 18 bears against a rigid washer 19 surrounding reduced portion 17, the washer 19, in turn bearing on a resiliently-deformable sealing gasket 20 surrounding portion 17 and interposed between washer 19 and the wall portion 13. The lower end of the reduced collar portion 17 is deformed outwardly to define a bottom flange 21, clampingly-securing the collar member 15 in fixed position on wall portion 13 with sealing pressure exerted on the gasket 20.

The top end of collar 15 is formed with an outwardly-projecting flange 22 which is provided with diametrically-opposed notches 23, 23. Detachably-mounted on the top end of collar 15 is an annular conduit fitting 24 having diametrically-opposed inwardly-projecting bottom lugs 25, 25 which can be engaged through the notches 23, 23, after which the fitting 24 is rotated through an angle of approximately 90°, whereby the lugs 25, 25 will be lockingly-engaged beneath diametrically-opposite portions of flange 22, as shown in FIGURE 5. The annular conduit fitting 24 has an internal bottom groove 27 in the lower portion of which flange 22 is received and in the upper portion of which an annular resiliently-deformable sealing ring 28 is received, as shown in FIGURE 2. The ring 28 is of substantial thickness and is relatively flat, and sealingly-engaged therethrough is the reduced lower-portion 29 of a sleeve member 30, portion 29 making tight frictional engagement in the ring 28 and being thus supported in upright position in axial alignment with collar 15. The lower portion 29 of sleeve 30 projects downwardly through collar 15, as shown in FIGURE 2.

Threadedly-engaged on the externally-threaded reduced upper portion 31 of conduit fitting 24 is a cap member 32, a resiliently-deformable sealing ring 33 being interposed between the bottom rim of cap member 32 and the top shoulder 34 defined externally-adjacent the reduced threaded portion 31. A conventional gas-admission valve 35 is threadedly-secured in cap member 32 in communication with the top portion of the cavity 36 of said cap member, as shown in FIGURE 2. The valve 35 may be similar to that employed in the ordinary pneumatic tire, being normally closed and opening responsive to gas pressure supplied thereto in the same manner as a tire valve opens when the tire is being inflated.

A bushing member 37 is threadedly-engaged centrally in the cap member 32, said bushing member having an annular clamping shoulder 38 beneath which is provided a flat resiliently-deformable sealing ring 39, whereby the bushing member 37 is sealed with respect to the cap member 32 when the shoulder 38 is clamped against the sealing ring 39 in the manner illustrated in FIGURE 2. Designated at 40, is a relatively long rigid conduit member which extends through sleeve 30, the conduit member being provided with a top sealing flange 41 which is clamped against an annular resiliently-deformable sealing ring 42 bearing on the top rim of sleeve 30. Thus, the sealing ring 42 and flange 41 are received in an annular recess 43 provided in the upper portion of the cavity 36, the top wall of the cap member 32 exerting clamping force on flange 41 which, in turn, is transmitted to the sealing ring 42, thus sealing the tube 40 relative to the cap 32. The external diameter of tube 40 is somewhat smaller than the internal diameter of sleeve 30, providing a gas passage therebetween. Sleeve 30 is provided with a gas-transmission aperture 44 placing space 36 in communication with the passage defined between tube 40 and the bore of sleeve 30. Thus, gas under pressure admitted through the valve 35 may flow through aperture 44 and between sleeve 30 and tube 40 downwardly into the top portion of the keg 12, acting to force the beverage in the keg out through the keg-tapping assembly in a manner to be described.

Tube 40 is of sufficient length to extend downwardly almost to the bottom of the keg 12. The bottom end of bushing 37 is formed with a flanged annular stud 45 on which is mounted a normally-collapsed live rubber conduit member 46. Thus, the conduit member 46, shown in FIGURE 4, comprises the cylindrical top skirt portion 47 and the collapsed normally-flattened body portion 48 having a normally-closed slit 49. The skirt member 47 is molded to lockingly-interengage with the flanged annular stud 45, whereby to secure the live rubber conduit member 46 securely onto stud 45 at the bottom end of bushing member 37. A draft tube 50 may be engaged through the bushing 37, being forced through the normally-flattened portion 48 of the live rubber conduit 46, opening the slit 49, and allowing the tube to be moved to the position thereof shown in FIGURE 2, whereby its bottom end extends almost to the bottom end of the larger tube 40. The draft tube 50 is provided at its top end with a flanged conduit fitting 51 whose enlarged lower portion includes the base flange 52 which is engageable against the top end of bushing member 37 as illustrated in FIGURE 2. A clamping nut member 54 is provided, said nut member having the annular recess 55 receiving flange 52, the nut member being further provided with an internally-threaded depending skirt portion 57 which is threadedly-engaged on the top portion of bushing member 37 in the manner clearly shown in FIGURE 2. The nut member is provided with diametrically-opposed wing elements 58, 58 facilitating the tightening or untightening of the nut.

A suitable delivery conduit 60 may be connected to the upstanding conduit portion 51 of draft tube 50, for delivery of the beverage from keg 12.

In operation, with the draft tube 50 mounted in operating position, as shown in FIGURE 2, when gas under pressure, for example, compressed air or compressed carbon dioxide, is admitted through the valve 35 into space 36 and passes by way of passage 44 and the clearance between sleeve 30 and tube 40 into the upper portion of keg 12, the pressure of the gas forces the liquid in the keg out through the draft tube 50. After the keg has been emptied and is to be returned for refilling, the draft tube 50 is removed by unfastening the clamping nut 54, namely, unthreading it from bushing 37, and by pulling the draft tube 50 upwardly until it is disengaged from the assembly. When this occurs, the lower portion 48 of the live rubber conduit member 46 collapses, sealing the assembly 14 so that no foreign materials or objects can fall into or enter the keg. This assures that the interior of the keg will not be contaminated while it is being returned to the brewery or other refilling station.

The assembly 14 can be disengaged from the keg 13 whenever necessary, for example, for cleaning or repair of its parts, by rotating the lower fitting 24 to approximately 90° to bring the lugs 25, 25 into registry with notches 23, 23, whereby to allow the assembly to be detached from the fixed collar member 15.

As shown in FIGURE 1, a suitable conduit 61 may be provided with a conventional valve fitting 62 adapted to be connected to the gas valve 35 for admitting gas under pressure into the assembly, as above-described, when it is desired to discharge beverage from the keg 12.

In the form of the invention shown in FIGURES 6, 7 and 8, a collar member 15' is sealingly-secured in an aperture 16 formed in a depressed portion of a keg top wall 13. The collar member 15' has an outwardly-extending top flange 22', and sealingly-clamped on top flange 22' is an annular bushing member 63. Thus, the bushing member 63 is formed with a depending sleeve portion 64 and a resiliently-deformable sealing ring 65 surrounds said sleeve portion 64, being interposed between bushing member 63 and top flange 22', being clamped therebetween by a pair of diametrically-opposed clamping screws 66, 66 engaged through outer portions of bushing member 63 and being threadedly-engaged with a retaining ring 67 surrounding collar 15' and engaged with the flange 22'.

As shown in FIGURE 8, the sealing ring 65 may be provided with a pair of diametrically-opposed notches 68 at its periphery to receive the respective clamping screws 66. The bushing member 63 may be suitably countersunk, as shown at 69, to receive the heads of the Allen screws 66 employed in the assembly.

Bushing member 63 is formed with a passage 70 communicating at its lower end with a notch 71 provided in the sealing ring 65, whereby to communicatively-connect passage 70 to the interior of collar 15'. A gas valve 35, similar to that previously described, is connected to the upper portion of bushing member 63 in communication with the top end of passage 70. Valve 35 is provided with a conventional detachable valve cap 72 which may be removed when it is desired to connect valve 35 to a source of gas under pressure. An inner bushing member 74 is sealingly-mounted in the bottom end of an internally-threaded counterbore 75 provided in bushing member 63, the inner bushing 74 having a top flange 76 which is peripherally-grooved and which receives a resiliently-deformable sealing ring 77, as shown in FIGURE 8, to seal inner bushing 74 in the counterbore 75. An annular plug 78 is threadedly-engaged in the counterbore 75 and clampingly-engages a resiliently-deformable sealing washer 79 disposed between annular plug 78 and the top end of inner bushing 74. Inner bushing 74 is formed with a depending annularly-grooved hollow stud member 45' on which is mounted a normally-collapsed live rubber conduit member 46 similar to that employed in the previously-described embodiment of the invention.

The top portion of bushing member 63 is formed with the downwardly-flaring recess 80 located above and coaxial with counterbore 75, the wall of the recess being provided with diametrically-opposed entry notches 81, 81, as shown in FIGURE 7. Designated at 82 is a knurled head member in which is axially-secured an elongated rigid draft tube 83, the tube 83 being sealingly-connected in a central bore provided in the knurled head member 82 and a depending sealing skirt 84 being provided around the tube 83 subjacent the head member 82, as shown in FIGURE 8. The head member 82 is provided at its bottom end with downwardly-flaring opposed lugs 85, 85 which are engageable through the notches 81, 81 and which can be rotated with the head member 82 to bring them into locking engagement with the downwardly-divergent inside wall surfaces of the recess 80, whereby to lockingly-secure the head member 82 in the recess 80.

The draft tube 83 has a knurled top end portion 86 projecting above the head member 82. A flexible beverage-delivery tube 87 may be engaged on the knurled top portion 86 of the draft tube in the manner illustrated in FIGURES 6 and 8.

As shown in FIGURES 6 and 8, the bottom end portion of draft tube 83 is provided with a plurality of beverage-intake apertures 89. With the device installed on a keg in the manner illustrated in FIGURES 6, 7 and 8, the draft tube 83 may be inserted through the live rubber conduit member 46, forcing the collapsed lower portion of the conduit member open, whereby to allow the draft tube to be fully inserted. The lugs 85, 85 are engaged through the notches 81, 81, and the resiliently-deformable collar member 84 is sealingly-received in the central aperture of the annular plug 78, in sealing contact with the subjacent washer 79. The head member 82 may then be rotated through an angle of approximately 90°, to move the lugs 85, 85 into locking-engagement with the downwardly-convergent opposing inside wall surface of the recess 80, as above-described.

The above-described procedure provides the relative configuration of parts illustrated in FIGURE 6, wherein the apertured lower end portion of draft tube 83 is located near the bottom wall of the keg 12. Valve cap 72 may then be removed and a suitable source of gas under pressure may be connected to the valve 35, whereby beverage can be discharged from the keg by admitting compressed gas through valve 35 and passages 70 and 71 into the upper portion of the keg. After the keg has been emptied, the draft tube 83 may be removed by rotating the head member 82 to a position allowing lugs 85, 85, to pass upwardly through notches 81, 81, whereby the tube 83 may be extracted, allowing the live rubber conduit member 46 to collapse to closed position, thereby sealing the keg against the entry of undesirable foreign objects or substances.

As in the case of the previously-described form of the invention, the major portions of the assembly may be subsequently removed, if so desired, since the screws 66, 66 may be disengaged from the retaining ring 67, allowing bushing member 63 to be detached from collar 15'. This provides access to the interior of the keg for cleaning same. In the previously-described form of the invention, the same result can be obtained by rotating the member 24 to bring the lugs 25, 25 into registry with the diametrically-opposed notches 23, 23 of flange 22.

Figures 10, 11:
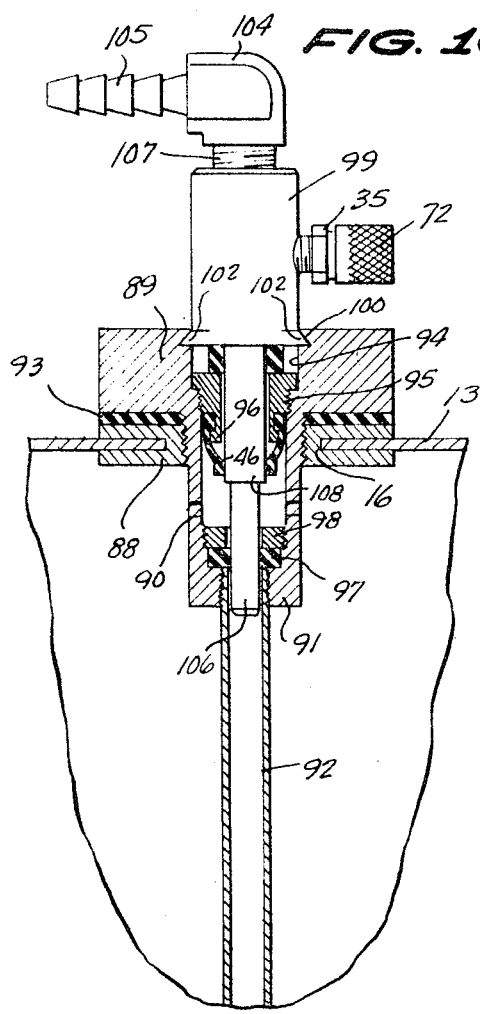
FIGURE 10 is an elevational view, partly in cross-section, of the assembly of FIGURE 9.
FIGURE 11 is a vertical cross-sectional view taken substantially on the line 11—11 of FIGURE 9, showing a complete cross-sectional view of the assembly.

In the form of the invention shown in FIGURES 9, 10 and 11, a collar member 88 is sealingly-secured in an aperture 16 provided in a wall portion 13 of a keg, the collar member 88 being internally-threaded. Threadedly-engaged in the collar is a bushing member 89 having a depending hollow stem portion 90 provided with a centrally-tapped bottom wall 91 in which is threadedly-secured a depending rigid conduit 92 extending almost to the bottom of the keg. As shown in FIGURES 10 and 11, a resiliently-deformable sealing washer 93 is provided between the top flange portion of member 89 and the external top portion of collar 88.

Bushing member 89 is formed with a central counterbore 94 in the lower end of which is threadedly-engaged an inner bushing 95 provided with a depending hollow, a externally-grooved stud portion 96 on which is mounted the live rubber, normally-collapsed sealing conduit 46, similar to those employed in the two embodiments of the invention previously-described.

A resiliently-deformable sealing washer 97 is provided on the bottom wall of the depending, generally cylindrical casing 90, being clampingly-engaged by a nut member 98 threaded in the lower portion of the interior of casing 90, as shown in FIGURE 10.

Nut member 98 may be adjusted to provide a desired amount of compression on the resiliently-deformable sealing washer 97.

Designated at 99 is a head member engageable in the top portion of counterbore 98, said top portion being provided with a downwardly-flaring top recess 100 having diametrically-opposed notches 101, 101, as shown in FIGURE 9. The head member 99 is provided with diametrically-opposed locking lug portions 102, 102 engageeable through the notches 101, 101 and thereafter rotatable into locking-engagement with the inside wall surface of recess 100 in a manner similar to that described in connection with the locking of the knurled head member 82 to the bushing member 63 in the form of the invention shown in FIGURES 6, 7 and 8.

The head member 99 has a central bore 103 in the top end of which is threaded a right-angled conduit fitting 104 having the horizontal annularly-serrated connection spout 105 adapted to be connected to a flexible beverage-delivery conduit. A rigid draft tube 106 is rigidly-secured in the depending stem portion 107 of conduit fitting 104, extending through a sleeve 108 mounted in the head member 99, a clearance space 109 being provided between tube 106 and sleeve 108, as shown in FIGURE 11. The sleeve 108 is of sufficient length to pass through and open the sealing conduit 46 when the head member 99 is installed in bushing member 89 in the manner shown in FIGURES 10 and 11, and the draft tube member 106 is of sufficient length to engage through the sealing washer 97 and extend into the top portion of the conduit 92.

As shown in FIGURE 11, a resiliently-deformable sealing collar 111 surrounds the upper portion of tube 106, providing a seal between tube 106 and the top end of sleeve 108. Thus, the resiliently-deformable annular sealing member 111 is compressed in the upper portion of bore 103 by being clamped between the bottom end of threaded stem 107 and the flanged top end of sleeve 108, forcing the flanged top end of the sleeve against an annular seat provided therefor in bore 103.

A conventional gas-admission valve 35 is connected to the head member 99 and is substantially in registry with an aperture 112 in the upper portion of sleeve 108, whereby to place the valve in communication with the clearance space 109 between tube 106 and sleeve 108.

A resiliently-deformable sealing collar 113 is provided on sleeve 108 immediately below head member 99, adapted to sealingly-engage with the annular inner bushing 95 in the manner shown in FIGURE 11.

The depending casing 90 is formed with a plurality of apertures 114 to allow compressed gas to pass therethrough into the upper portion of the associated keg. Thus, when a source of compressed gas is connected to the valve 35, the gas may flow through aperture 112 into the clearance space 109 and then downwardly into the depending casing 90 and into the top portion of the keg by way of the apertures 114. The compressed gas in the top portion of the keg forces liquid upwardly through tube 92 and through draft tube 106 to the conduit fitting 104 and thence to the beverage-delivery conduit connected to its outlet element 105.

The draft tube may be connected to the other portions of the assembly by inserting same through the normally-collapsed sealing conduit 46, the lower end portion of sleeve 108 forcing the lips of the live rubber sealing conduit open and the lower end portion of draft tube 106 passing through the sealing washer 97 so that it can assume the position thereof shown in FIGURE 11. The head member 99 may then be rotated 90° to lock the lugs 102, 102 in the downwardly-flaring recess 100 in a manner similar to that described in connection with the form of the invention of FIGURES 6, 7 and 8.

After the keg has been substantially emptied, the draft tube attachment may be removed by rotating head 99 to bring the lugs 102, 102 into registry with notches 101, 101 after which head member 99 is raised to remove its depending portions from the bushing 89, allowing the conduit 46 to close. This seals the keg and prevents the entry of undesired foreign materials or objects. The bushing member 89 may be removed, along with the parts carried thereby by unscrewing same from the collar 88, thereby allowing access to the interior of the keg for cleaning.

It will be understood that the conventional pressure-responsive gas valve 35 may be replaced by any other suitable normally-closed check valve opening responsive to exposure to external gas pressure.

While certain specific embodiments of an improved keg-tapping assembly have been disclosed in the foregoing description, it will be understood that various modifications within the spirit of the invention may occur to those skilled in the art.

What is claimed is:

1. In combination with a beverage keg, a beverage-extracting assembly comprising a collar member sealingly-mounted in an aperture in the keg, a bushing assembly mounted on said collar member, said bushing assembly including a depending tubular member coaxial with and extending into the collar member, inner bushing means secured coaxially on said bushing assembly and being provided with a depending annular externally-grooved hollow stud element, a normally-collapsed conduit of resiliently-deformable material having a normally-cylindrical upper portion clampingly and sealingly-engaged within the externally-grooved portion of said stud element so as to be located substantially coaxially with said tubular member, a rigid draft tube engaged through said resiliently-deformable conduit and holding it in expanded condition sealingly-engaging the draft tube, gas inlet conduit means connected to said bushing assembly, and means defining a gas passage from said gas inlet conduit means through said bushing assembly and extending externally adjacent said depending tubular member for communication with the upper portion of the keg, the resiliently-deformable conduit collapsing to seal the keg responsive to withdrawal therefrom of the draft tube.

2. The structural combination of claim 1, and wherein the depending tubular member is of sufficient length to extend downwardly almost the bottom of the keg so as to act as a guide for the draft tube upon insertion of the draft tube into the keg.

3. The structural combination of claim 1, and means detachably-securing said rigid draft tube to said bushing assembly with the lower portion of the draft tube in the lower portion of the keg.

4. The structural combination of claim 2, and wherein said last-named means comprises a head member secured on the draft tube, said bushing assembly being recessed to receive said head member, and interengaging locking means on the head member and said bushing assembly.

5. The structural combination of claim 4, and wherein said locking means comprises a plurality of projections on the head member, said bushing assembly being notched to pass said projections, and means to lock the projections to the bushing assembly responsive to rotation of the head member.

6. The structural combination of claim 5, and wherein the bushing assembly is formed with undercut recesses in which the projections are lockingly-engageable responsive to said rotation of the head member.

7. The structural combination of claim 6, and wherein said gas inlet conduit means comprises a normally-closed check valve opening responsive to external gas pressure.

8. The structural combination of claim 6, and means to detachably-secure the bushing assembly to said collar member.

9. The structural combination of claim 8, and wherein said last-named means comprises means to clamp the bushing assembly to the collar member and resiliently-deformable sealing means interposed between the bushing assembly and the collar member and compressed by said clamping means.

10. The structural combination of claim 8, and wherein said undercut recesses comprise a downwardly-flaring substantially frusto-conical countersunk recess formed in the top of the bushing assembly, the recess having peripheral notches to allow passage of said projections therethrough, the projections having downwardly and outwardly-inclined outer locking surfaces engageable with the downwardly-flaring frusto-conical surface of the countersunk recess when the head member is rotated to locking position in the bushing assembly.

References Cited

UNITED STATES PATENTS

| | | | |
|---|---|---|---|
| 604,596 | 5/1898 | Hildenbrand | 137—212 XR |
| 710,631 | 10/1902 | Tietz | 137—325 |
| 2,081,131 | 5/1937 | Barnes | 217—113 |
| 2,223,012 | 11/1940 | Wanderski et al. | 222—400.7 |
| 2,539,349 | 1/1951 | Giles | 222—400.7 |
| 2,757,682 | 8/1956 | Nicks | 137—212 |
| 2,830,611 | 4/1958 | Stelma | 137—322 |

ROBERT G. NILSON, Primary Examiner

U.S. Cl. X.R.

137—320; 222—400.7